(12) United States Patent
Bonnet

(10) Patent No.: US 9,409,233 B2
(45) Date of Patent: Aug. 9, 2016

(54) METHOD FOR MANUFACTURING A MOLDING ELEMENT BY FRITTING WITH A COMPLETELY PLANAR UNFRITTED PORTION, AND CORRESPONDING MOLDING ELEMENT

(75) Inventor: Daniel Bonnet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/118,453

(22) PCT Filed: May 16, 2012

(86) PCT No.: PCT/EP2012/059107
§ 371 (c)(1),
(2), (4) Date: Dec. 20, 2013

(87) PCT Pub. No.: WO2012/156439
PCT Pub. Date: Nov. 22, 2012

(65) Prior Publication Data
US 2014/0147538 A1    May 29, 2014

(30) Foreign Application Priority Data

May 17, 2011 (FR) ...................... 11 54252

(51) Int. Cl.
| B29D 30/06 | (2006.01) |
| B22F 5/00 | (2006.01) |
| B23K 26/34 | (2014.01) |
| B22F 3/105 | (2006.01) |
| B22F 7/08 | (2006.01) |
| B23K 35/02 | (2006.01) |
| B23K 26/32 | (2014.01) |

(52) U.S. Cl.
CPC ............... *B22F 5/007* (2013.01); *B22F 3/1055* (2013.01); *B22F 7/08* (2013.01); *B23K 26/32* (2013.01); *B23K 26/34* (2013.01); *B23K 35/0244* (2013.01); *B29D 30/0601* (2013.01); *B29D 30/0606* (2013.01); *B23K 2201/20* (2013.01); *B23K 2203/50* (2015.10); *B29D 2030/0614* (2013.01); *B29D 2030/0616* (2013.01); *Y02P 10/292* (2015.11); *Y02P 10/295* (2015.11)

(58) Field of Classification Search
CPC ........... B29D 30/0601; B29D 30/0606; B29D 2030/0614; B29D 2030/0616; B22F 3/1055; B22F 3/11; B22F 5/007; B22F 7/08; B23K 26/34; B23K 26/3206
See application file for complete search history.

(56) References Cited

U.S. PATENT DOCUMENTS

| 5,753,274 A | 5/1998 | Wilkening et al. |
| 7,261,550 B2 * | 8/2007 | Herzog .......................... 425/547 |

(Continued)

FOREIGN PATENT DOCUMENTS

DE    102004028462 A1    12/2005

OTHER PUBLICATIONS

PCT/EP2012/059107—International Search Report (english version included), dated Sep. 6, 2012, 4 pages.

*Primary Examiner* — James Mackey
(74) *Attorney, Agent, or Firm* — Dickinson Wright PLLC

(57) ABSTRACT

The invention relates to a method of manufacturing a molding element for a tire mold. The molding element comprises a sintered part and a non-sintered part attached to the sintered part. The sintered part comprises a shell and a core internal to the shell and formed as one piece with the said shell. The core comprises a meshed structure comprising a plurality of cavities. The method of manufacture comprises a step of manufacturing the sintered part of the molding element from a metallic powder deposited on a flat surface of a support plate and fused layer by layer, the sintered part being attached to the support plate by fused metallic powder. The method also comprises a step of machining the support plate to form the non-sintered part of the molding element.

12 Claims, 4 Drawing Sheets

(56) References Cited

U.S. PATENT DOCUMENTS

| | | | |
|---|---|---|---|
| 7,670,124 B2* | 3/2010 | Hyodo | 425/46 |
| 2001/0048182 A1* | 12/2001 | Caretta et al. | 425/46 |
| 2002/0020164 A1 | 2/2002 | Cleveland et al. | |
| 2005/0112230 A1 | 5/2005 | Herzog | |
| 2009/0162465 A1* | 6/2009 | Komornik et al. | 425/47 |

* cited by examiner

METHOD FOR MANUFACTURING A MOLDING ELEMENT BY FRITTING WITH A COMPLETELY PLANAR UNFRITTED PORTION, AND CORRESPONDING MOLDING ELEMENT

CROSS-REFERENCE TO PRIOR APPLICATIONS

This application claims the benefit of the filing date of PCT Application No. PCT/EP2012/059107, filed May 16, 2012, which claims the benefit of the filing date of the French Application No. 1154252, filed May 17, 2011, each document being incorporated by reference in its entirety for all purposes.

BACKGROUND

1. Field

The present invention relates to the manufacture of a molding element by sintering and more particularly to the manufacture of a molding element intended to be arranged in a mold for tires, notably a mold of the segmented type.

2. Description of Related Art

A segmented mold comprises several separate pieces which, by being brought closer together, delimit a molding space of toroidal overall shape. In particular, a segmented mold comprises two lateral shells for molding the sidewalls of the tire and several peripheral segments situated between the shells for molding the tread of the tire. All of these pieces are brought mutually closer together by suitable kinematics, using a determined mechanism.

In order to mold the tread, the mold segments comprise molding elements. A molding element means any element of the mold which comprises a molding surface that allows part of the tread of a tire to be molded. A molding element may therefore be a block assembled on a mold segment or a protrusion, such as a blade or a strip, attached to the radially interior surface of the mold.

It is possible to create a molding element by a selective fusion method more commonly referred to as sintering. This method uses a beam of energy to fuse a metallic powder. A "beam of energy" means electromagnetic radiation (for example a laser beam) or a beam of particles (for example a beam of electrons).

A sintering method that employs a laser, hereinafter referred to as a laser sintering method, is known from document EP 1 641 580. In that document, a first layer of metallic powder is spread on a plate. All or some of the particles of this first layer of powder are then agglomerated by the beam of a laser according to the shape of the object that is to be obtained. Once this step has been carried out, a second layer of powder is spread over the first layer of powder and is in its turn selectively fused by laser. By repeating these operations of spreading a layer and fusing it using a laser a sintered object is built up layer by layer.

Laser fusing generates thermal expansions within the sintered object and this causes stresses to appear after the object has returned to ambient temperature. When the sintered object is detached from the support plate, for example during a rapid cutting using a wire, stresses cause the sintered object to deform. If the sintered object is a solid object then such deformations are even more extensive.

In order to limit such deformations, document WO 2010/076503 discloses a molding element produced by laser sintering that has a particular internal arrangement. The molding element thus comprises a fine shell delimiting an interior volume and a core internal to the shell. The shell is solid and the internal core has a meshed structure comprising a plurality of cavities. To improve the thermal conductivity of the molding element, the cavities of the core are filled with non-fused metallic powder.

Although the molding element of document WO 2010/076503 exhibits less deformation when detached from a support plate, there are still concentrations of stresses in the region of the shell. The operation of detaching the molding element from the support plate therefore leads to some degree of deformation of the shell and, in certain extreme cases of deformation, cracks may appear in this shell. It is thus possible for non-fused powder to escape from these cracks, then leading to a risk of contaminating the tooling and therefore the molded tires and leading to a risk of this powder being inhaled by an operator handling the molding element.

Document DE 10 2004 028 462 discloses a molding element comprising a sintered part and a non-sintered part attached to this sintered part. The non-sintered part has a junction surface where it joins the non-sintered part which is completely flat thus preventing the use of the sintering method as disclosed in document EP 1 641 580.

There is therefore a need to offer a method for manufacturing a molding element by laser sintering which is simple and economical and guarantees limited deformation of this molding element after it has been manufactured and a high level of safety with respect to any non-fused powder present in the molding element.

SUMMARY

The disclosure relates to a method of manufacturing a molding element for a tire mold. The molding element comprises a sintered part and a non-sintered part attached to the sintered part. The sintered part comprises a shell and a core internal to the shell and formed as one piece with the said shell. The core comprises a meshed structure comprising a plurality of cavities. The method of manufacture comprises a step of manufacturing the sintered part of the molding element from a metallic powder deposited on a flat surface of a support plate and fused layer by layer, the sintered part being attached to the support plate by fused metallic powder. The method also comprises a step of machining the support plate to form the non-sintered part of the molding element.

The disclosure thus proposes manufacturing a molding element in two distinct steps.

The first step is to form the molding surface of the molding element, namely the surface intended to mold part of the tread of the tire. This first step is performed using laser sintering, making it possible to achieve complex components.

The second step is to form a base for positioning the molding element in the mold. This base does not have a shape that is particularly difficult to achieve. It can therefore be machined from the support plate using a conventional method such as milling, turning or grinding.

The method of manufacturing the molding element does not involve a step of detaching the sintered part comprising the molding surface from the non-sintered part that forms the base. The sintered part of the molding element thus remains attached to the non-sintered part of this element and the junction between these two parts is obtained using fused metallic powder. The non-sintered part of the molding element then strengthens the sintered part. The molding element thus carries a low risk of deforming after manufacture, thus guaranteeing that the shell will not leak.

For preference, that the powder is fused by laser means.

For preference, the support plate is machined in such a way that the non-sintered part formed by this machining constitutes a base on which the sintered part of the molding element rests completely.

Thus it is possible for the internal core to rest directly on the base without the need to provide a shell part between this internal core and this base. The time taken to manufacture the sintered part is thus improved. Further, the base delimits the internal core in its bottom part and prevents any non-fused powder from escaping from this core.

In an alternative form of embodiment, the step of manufacturing the non-sintered part creates a junction between the sintered part and the support plate. The non-sintered part machined from this support plate and the sintered part of the molding element come together exactly at this junction.

There is therefore surface continuity between the external surface of the sintered part and the external surface of the non-sintered part in the region of the junction between these two parts. The component therefore has a uniform overall appearance.

For preference, during the step of manufacturing the sintered part a wall of fused metallic powder is formed, extending throughout the entire thickness of the sintered part. This wall is able to delimit a passage isolated from the cavities of the core. Following the step of manufacturing the sintered part, a hole is pierced in the non-sintered part opposite the passage present in the sintered part. The hole then extends the said passage so as to form a vent in the molding element.

A vent is thus produced in the molding element in a simple and practical way and without having the pierce the shell. Specifically, the passage present in the sintered part is formed layer by layer at the same time as this sintered part. The passage is thus delimited by a wall which isolates it from the cavities belonging to the core. No non-fused metallic powder present in the cavities can therefore escape through this passage. Furthermore, it is possible to use the passage as a means for guiding a piercing means, for example a drill bit, to pierce a hole in the non-sintered part. This then ensures that the hole formed is indeed in the continuation of the passage so as to optimise the ability of the vent to vent air.

For preference, the method comprises a step of assembling the molding element with another molding element.

For cost reasons, the support plates from which the molding elements are made have standard dimensions. To manufacture large-sized tires, the molding elements need to be sized accordingly. Now, the dimensions of such molding elements may be far greater than the dimensions of the support plates used. Thanks to the invention, it is possible to manufacture various molding sub-elements the dimensions of which are suited to the support plates used. These molding sub-elements are then assembled to form a complete molding element suited to molding large-sized tires.

For preference, the method involves a step of machining a plurality of striations on the flat surface of the support plate, the said striations being mutually parallel and evenly distributed over the said flat surface.

The striations form zones in which powder is stored, thus improving the distribution of this powder over the support plate. It thus becomes easier to obtain layers of powder of constant thickness.

Another subject of the invention relates to a molding element manufactured from the method of manufacture as described hereinabove. The molding element thus comprises a sintered part manufactured from a metallic powder which is fused layer by layer. The sintered part comprises a shell and a core internal to the shell formed as one piece with the shell. The core further comprises a meshed structure comprising a plurality of cavities. In the invention, the molding element comprises a non-sintered part attached to the sintered part of the molding element by fused metallic powder. The junction between the sintered part and the non-sintered part of the molding element is completely flat.

For preference, the non-sintered part constitutes a base on which the sintered part of the molding element rests completely.

For preference, the non-sintered part and the sintered part come together exactly at their junction.

For preference, the molding element comprises at least one vent. The vent comprises a passage formed by sintering with the sintered part of the molding element, this passage being isolated from the cavities of the core by a wall of fused metallic powder. The vent further comprises a hole belonging to the non-sintered part of the molding element, this hole extending this passage.

For preference, the molding element is formed by assembling at least two portions of molding elements manufactured beforehand according to the method of manufacture as described hereinabove.

Another subject of the invention is a mold for molding and vulcanizing a tire. This mold comprises at least one molding element as described hereinabove.

BRIEF DESCRIPTION OF THE DRAWINGS

Other features and advantages of embodiments of the invention will become apparent from the following description, given by way of non-limiting example, with reference to the attached drawings in which.

DETAILED DESCRIPTION OF SPECIFIC EMBODIMENTS

In the following description, elements that are substantially identical or similar will be denoted by identical references.

In the present description, the invention is described for the instance in which the molding element is a block of a mold segment. However, it must be noted from the outset that the invention is not restricted to this particular embodiment and may notably be applied to instances in which the molding element is a protrusion, such as a blade or a strip, added on to the radially internal surface of a mold.

Likewise, the invention is described here for the case where the beam of energy used to sinter the powder is a laser beam. Of course, it is possible to use any other beam of energy, such as a beam of electrons.

Figure 1:
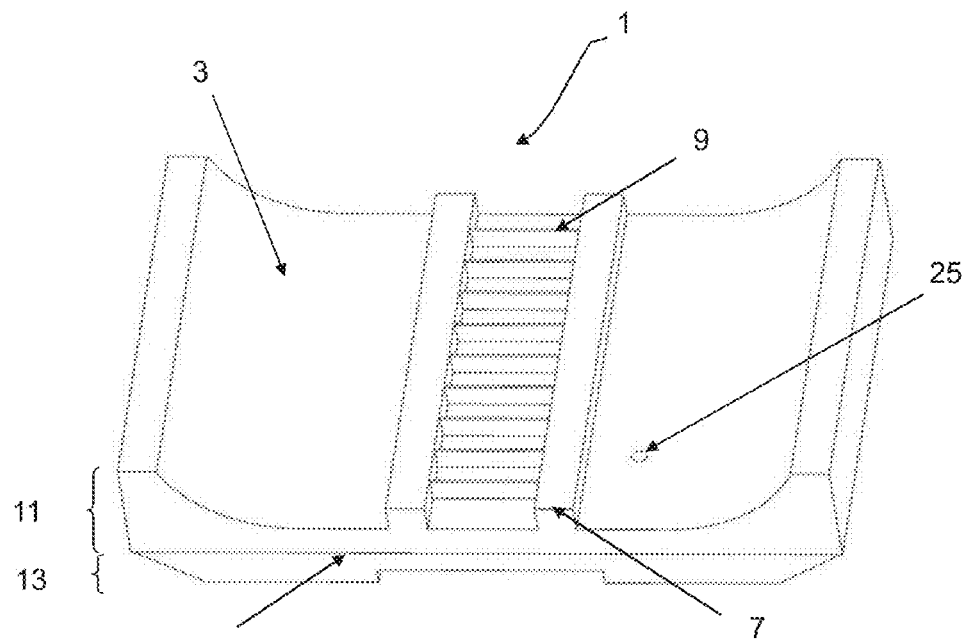
FIG. 1 is a perspective view of a molding element according to the invention.

FIG. 1 depicts a block, denoted by the overall reference 1, of a segmented mold intended for vulcanizing a tire.

The block 1 comprises a molding surface 3 able to mold part of the tread of the tire.

More specifically, the molding surface 3 comprises a plurality of protrusions 7, 9, the number of which has been limited here in order to make FIG. 1 easier to understand. This FIG. 1 therefore shows two strips 7 and blades 9. The strips 7 are intended to mold grooves in the tread, namely cutouts the width of which is greater than or equal to 2 mm. The blades 9 are intended to mold sipes in the tread, which means cutouts of a width smaller than 2 mm.

The block 1 is made up of an upper part 11 comprising the molding surface 3 and of a lower part 13 forming a base for positioning the molding element in the mold. The upper part 11 and the lower part 13 of the block meet along a junction plane. When viewed from the side, the junction plane forms an entirely rectilinear junction line 14.

More particularly, the upper part 11 is produced by laser sintering from a metallic powder which is fused layer by layer using laser means. The lower part 13 is a solid component which strengthens the upper part 11. In order to ensure a good junction between the parts 11, 13 of the molding element, the lower part 13 is made of a material compatible with the metallic powder used to manufacture the upper part 11. This material is, for example, steel.

Figure 2:
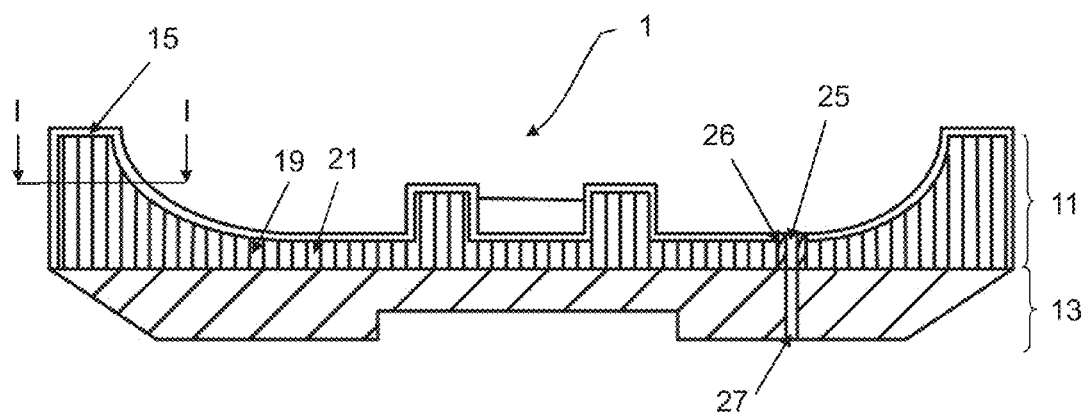
FIG. 2 is a schematic view in section of the molding element of FIG. 1.

FIG. 2 depicts a view in section of the block 1 of FIG. 1. In this cross section it is possible to see the internal arrangement of the upper part 11. The upper part 11 thus comprises a fine shell 15 and a core internal to the shell. The shell 15 in this instance is solid and has a thickness of between 0.25 and 2 mm. The shell 15 is thus rigid enough to be used in a tire vulcanizing mold.

What is meant by "solid shell" is that the shell 15 is formed only of fully fused metallic powder.

The core internal to the shell 15 has a non-solid structure. More specifically, the core comprises a meshed structure comprising a plurality of partitions 19 delimiting cavities 21. The partitions 19 are formed of powder which has been agglomerated by laser fusing. The cavities 21 contain non-fused powder.

Figure 3:
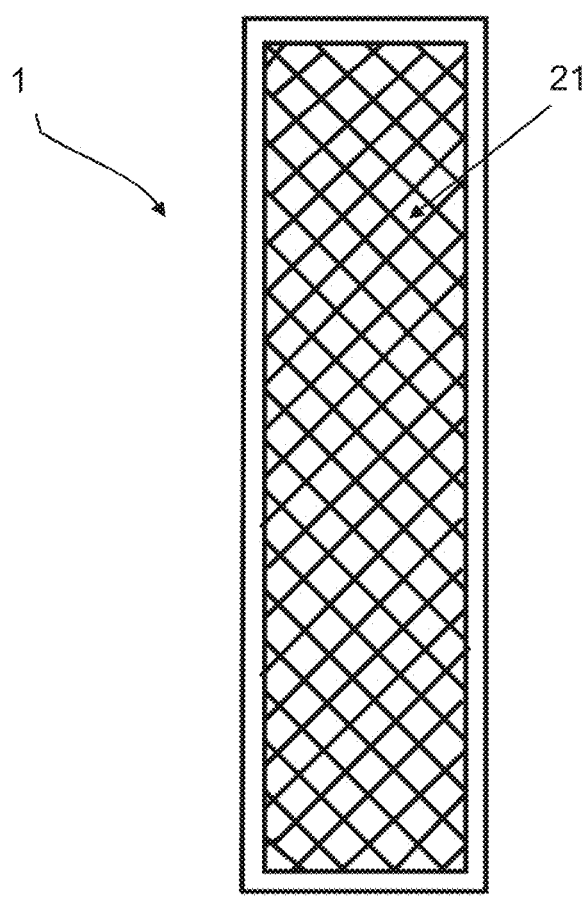
FIG. 3 is a schematic view in section on I-I of the molding element according to FIG. 2.

By way of illustration, FIG. 3 shows a meshed structure in which the cross section of the cavities 21 is square in shape and the length of the sides of the cavities is between 0.1 and 2 mm. Other shapes may be envisaged, for example the cross section of the cavities may be triangular, rectangular, or honeycomb.

It will be noted that the use of a meshed structure allows time to be saved in the manufacture of the molding element because there is no need to fuse all of the metallic powder of the core. The partitions of the core are thus dimensioned such that the core is sufficiently able to withstand the mechanical stresses associated with molding the tire. By way of example, the thickness of the partitions is between 0.1 and 0.2 mm.

As has already been specified, non-fused powder is present in the cavities 21. The presence of this non-fused powder improves the thermal conductivity of the molding element, and this improves the degree to which the green tire is heated during the vulcanizing operation.

The block 1 of FIG. 2 also comprises at least one vent comprising a passage 25 and a hole 27.

The passage 25 extends in the upper part 11 of the molding element and opens out onto the shell 15. A wall 26 isolates the passage 25 from the cavities 21 of the core. This wall 26 extends throughout the thickness of the upper part 11.

The hole 27 extends the passage 25 in the lower part 13 of the molding element. This hole 27 opens out onto an external surface of the lower part 13.

The vent thus allows air to be vented to outside the mold.

FIGS. 4A, 4B, 4C, 4D, 4E depict various steps in a method of manufacturing the block 1.

Figure 4:
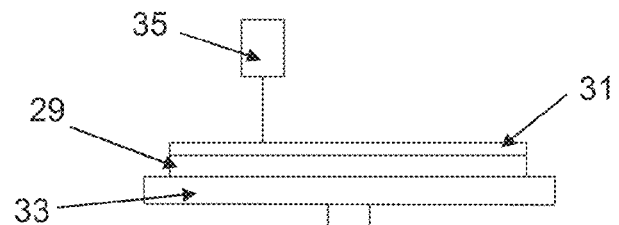
FIGS. 4A, 4B, 4C, 4D, 4E depict various steps in a method of manufacturing the molding element of FIG. 1.
Figure 4:
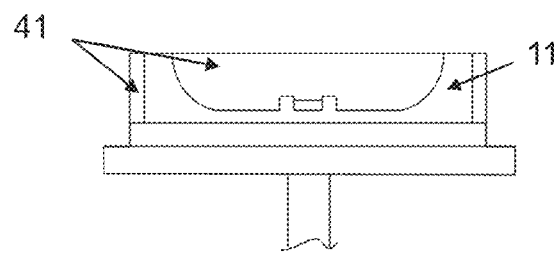
Figure 4:
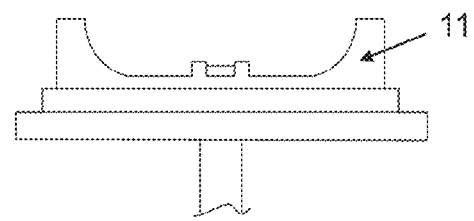

In a first step visible in FIG. 4A, a first layer 31 of metallic powder is spread over a support plate 29. The support plate 29 here has a parallelepipedal overall shape comprising a flat surface over which the powder is spread. The support plate 29 rests on a bed referenced 33 belonging to the manufacturing machine.

In this first step, all or some of the particles of the first layer are agglomerated by laser means 35 according to the shape that the upper part 11 of the block 1 is to be given. These laser means 35 comprise a laser capable of generating a laser beam to fuse the powder and a computer (not depicted in FIG. 4A) controlling the laser. The computer for example contains a model of the upper part 11 of the block 1.

By repeating these operations of spreading a layer and fusing it using a laser, a powder assembly is obtained, visible in FIG. 4B, that comprises fused powder forming the upper part 11 of the block 1 and non-fused powder 41 that partially or fully covers this upper part 11.

In a step that can be seen in FIG. 4C, non-fused powder 41 is removed to keep the upper part 11 of the block 1 clear.

Figure 4D:
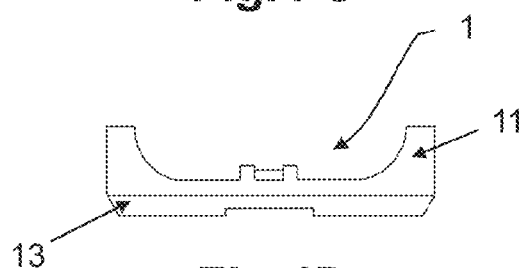

In a step visible in FIG. 4D, the support plate 29 is machined to form the lower part 13 of the block 1. The support plate 29 is machined in such a way that the lower part 13 completely extends the upper part 11. The block 1 thus has unity of shape.

Figure 4E:
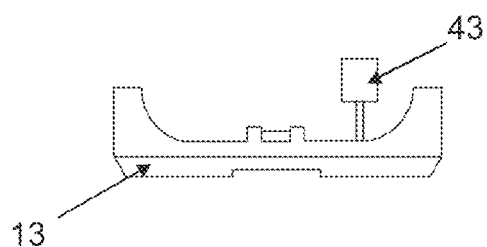

In a step visible in FIG. 4E, the lower part 13 of the block is pierced using piercing means 43 so as to form at least one vent in the block.

Figure 5:
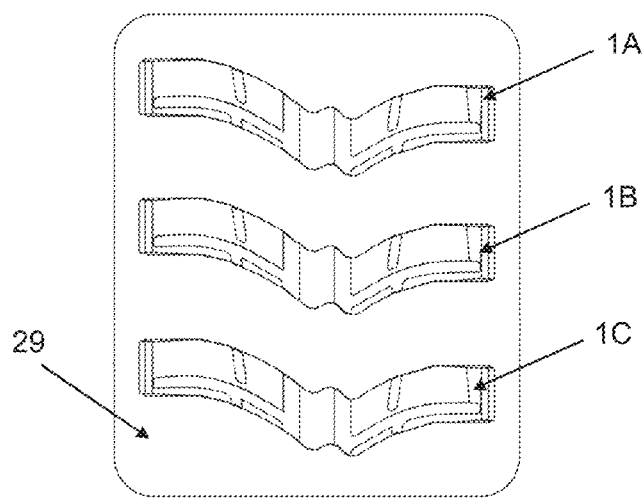
FIG. 5 shows a support plate on which a plurality of molding elements has been sintered.

It will be noted that FIGS. 4A to 4E described the manufacture of a single block on a single support plate. Of course, it is possible to form several sintered parts of several blocks 1A, 1B, 1C on one and the same support plate 29, as has been depicted in FIG. 5.

The invention is not restricted to the examples described and depicted and various modifications can be made thereto without departing from the scope thereof.

In particular, it is possible to use a more complex meshed structure for the core of the molding element. For example, it is possible to add a network of beams between the partitions of the core so as to strengthen the structure of this core.

In the example of FIG. 2, the core is attached directly to the lower part 13. As an alternative, the shell 15 continues between the core and the lower part 13. The shell 15 therefore completely encloses the core.

In an alternative form of embodiment, the method of manufacturing the block 1 comprises, prior to the step of manufacturing the sintered part, a step of machining a plurality of striations on the flat surface of the support plate. The striations are mutually parallel and evenly distributed over this flat surface. By way of example, the striations are between 2 and 4 microns deep and the spacing between the striations is between 1 and 50 microns. The striations are, for example, machined using an abrasive wheel. It will be noted that the striations have a depth that is extremely shallow with respect to the dimensions of the surface of the plate on which the powder is deposited, so that the surface of the support plate can be considered to be flat despite the presence of these striations.

Figure 6:
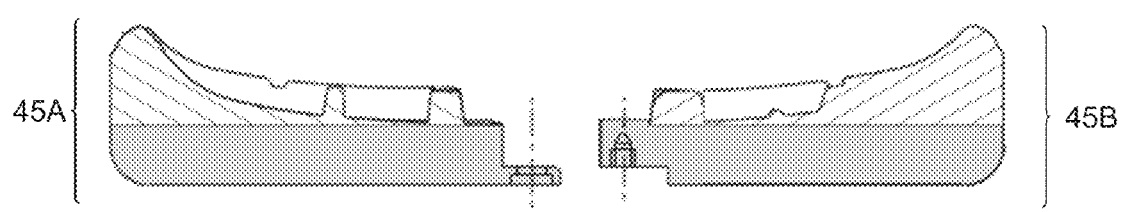
FIG. 6 depicts a molding element formed by assembling two molding half-elements manufactured beforehand according to the method of manufacture of FIGS. 4A to 4E.

In an alternative form of embodiment visible in FIG. 6, the block 1 is made up of an assembly of several block portions 45A, 45B. Each block portion comprises a sintered part (the hatched part in FIG. 6) and a non-sintered part (the shaded part in FIG. 6). In this instance, these block portions are assembled by screwing using means of assembly (not depicted here). As an alternative, these block portions are assembled by bonding, welding or any other means.

The invention claimed is:

1. A method of manufacturing a molding element for a tire mold, the molding element comprising a sintered part and a non-sintered part attached to the sintered part, the sintered part comprising a shell and a core internal to the shell and formed as one piece with the shell, the core comprising a meshed structure comprising a plurality of cavities, the method comprising:
    manufacturing the sintered part of the molding element from a metallic powder deposited on a surface of a non-sintered support plate which is completely flat except for any machined striations, wherein the metallic powder is fused layer by layer, and wherein the sintered part is attached to the support plate by fused metallic powder;
    machining the support plate to form the non-sintered part of the molding element,
    the machining of the support plate forms the non-sintered part formed as a base on which the sintered part of the molding element rests completely, and
    the support plate is machined to create a surface exactly the size of the sintered part at a junction where the support plate and the sintered part meet.

2. The method of manufacture according to claim 1, wherein the metallic powder is fused by laser means.

3. The method of manufacture according to claim 1, further comprising creating the junction between the sintered part and the support plate, wherein the non-sintered part machined from this support plate and the sintered part of the molding element come together exactly at this junction.

4. The method of manufacture according to claim 1, wherein during the step of manufacturing the sintered part, a wall of fused metallic powder is formed, extending throughout the entire thickness of the sintered part, wherein the wall is adapted to delimit a passage isolated from the cavities of the core, and wherein following manufacturing the sintered part, a hole is pierced in the non-sintered part opposite the passage present in the sintered part, the hole extending the passage so as to form a vent in the molding element.

5. The method of manufacture according to claim 1, further comprising assembling the molding element with another molding element.

6. The method of manufacture according to claim 1, further comprising, prior to manufacturing the sintered part, machining a plurality of striations on the flat surface of the support plate, wherein the striations are mutually parallel and evenly distributed over the flat surface.

7. A molding element for a tire mold comprising:
    a sintered part manufactured from a metallic powder that has been fused layer by layer, the sintered part comprising a shell and a core internal to the shell and formed as one piece with the shell, the core comprising a meshed structure comprising a plurality of cavities, wherein the molding element comprises a non-sintered part attached to the sintered part of the molding element by fused metallic powder, and wherein the junction between the sintered part and the non-sintered part of the molding element is completely flat,
    wherein the non-sintered part is machined so that a surface of the non-sintered part that meets a surface of the sintered part at the junction is exactly the same size as the surface of the sintered part at the junction.

8. The molding element according to claim 7, wherein the non-sintered part constitutes a base on which the sintered part of the molding element rests completely.

9. The molding element according to claim 8, wherein the non-sintered part and the sintered part come together exactly at their junction.

10. The molding element according to claim 7, further comprising at least one vent, the vent comprising a passage formed by sintering with the sintered part of the molding element and a hole belonging to the non-sintered part of the molding element and extending the passage, the passage of the vent being isolated from the cavities of the core by a wall of fused metallic powder.

11. The molding element according to claim 7, wherein the molding element is formed by assembling at least two portions of molding elements manufactured beforehand.

12. A mold for vulcanising and molding a tire, the mold comprising at least one molding element according to claim 7.

* * * * *